United States Patent
Kamiya et al.

(10) Patent No.: US 11,773,208 B2
(45) Date of Patent: Oct. 3, 2023

(54) CATIONICALLY CURABLE COMPOSITION AND CURED PRODUCT PRODUCTION METHOD

(71) Applicant: Dexerials Corporation, Tokyo (JP)

(72) Inventors: Kazunobu Kamiya, Tokyo (JP); Hiroki Shibuya, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 85 days.

(21) Appl. No.: 17/055,350

(22) PCT Filed: Jun. 7, 2019

(86) PCT No.: PCT/JP2019/022767
§ 371 (c)(1),
(2) Date: Nov. 13, 2020

(87) PCT Pub. No.: WO2019/240044
PCT Pub. Date: Dec. 19, 2019

(65) Prior Publication Data
US 2021/0214489 A1 Jul. 15, 2021

(30) Foreign Application Priority Data
Jun. 13, 2018 (JP) .................. 2018-112772

(51) Int. Cl.
*C08G 59/70* (2006.01)
*C08G 59/40* (2006.01)
(Continued)

(52) U.S. Cl.
CPC ......... *C08G 59/70* (2013.01); *C08G 59/4021* (2013.01); *C08J 3/24* (2013.01); *C08J 3/28* (2013.01); *C08K 7/22* (2013.01)

(58) Field of Classification Search
None
See application file for complete search history.

(56) References Cited

U.S. PATENT DOCUMENTS 4,406,764 A  9/1983  Hayase et al.
4,954,534 A  9/1990  Yamamuro
(Continued)

FOREIGN PATENT DOCUMENTS

CN  101925628 A  12/2010
CN  106661202 A  5/2017
(Continued)

OTHER PUBLICATIONS

International Search Report (PCT/ISA/210) and an English translation thereof, and Written Opinion (PCT/ISA/237) dated Jul. 16, 2019, by the Japanese Patent Office as the International Searching Authority for International Application No. PCT/JP2019/022767.
(Continued)

*Primary Examiner* — Megan McCulley
(74) *Attorney, Agent, or Firm* — BUCHANAN INGERSOLL & ROONEY PC

(57) ABSTRACT

A cationic curable composition that generates a silanol group by light irradiation and is cured by heat, the cationic curable composition including: a cationic curable component; porous particles holding an aluminum chelate; and a photodegradable silicon compound that generates a silanol group by photodegradation.

11 Claims, 4 Drawing Sheets

(51) Int. Cl.
*C08J 3/24* (2006.01)
*C08J 3/28* (2006.01)
*C08K 7/22* (2006.01)

(56) References Cited

U.S. PATENT DOCUMENTS

| | | | | |
|---|---|---|---|---|
| 4,975,471 | A | * 12/1990 | Hayase | C08G 65/269 |
| | | | | 522/167 |
| 5,026,793 | A | * 6/1991 | Nakai | C07F 7/1896 |
| | | | | 525/440.12 |
| 5,684,095 | A | * 11/1997 | Morimoto | C08G 59/28 |
| | | | | 525/476 |
| 2010/0249338 | A1 | 9/2010 | Kamiya | |
| 2017/0253694 | A1 | 9/2017 | Kamiya | |
| 2019/0203087 | A1 | 7/2019 | Kamiya | |

FOREIGN PATENT DOCUMENTS

| | | |
|---|---|---|
| EP | 0114258 A1 | 8/1984 |
| JP | S5710620 A | 1/1982 |
| JP | S5710621 A | 1/1982 |
| JP | S57125212 A | 8/1982 |
| JP | S6071628 A | 4/1985 |
| JP | S61218624 A | 9/1986 |
| JP | S6315817 A | 1/1988 |
| JP | H01103621 A | 4/1989 |
| JP | 2002-256058 A | 9/2002 |
| JP | 2011021132 A | 2/2011 |
| JP | 2013189555 A | 9/2013 |
| JP | 5458596 B2 | 4/2014 |
| JP | 5481013 B2 | 4/2014 |
| JP | 5707662 B2 | 4/2015 |
| JP | 2016056274 A | 4/2016 |
| JP | 2017222781 A | 12/2017 |
| TW | 200936633 A | 9/2009 |

OTHER PUBLICATIONS

Notification of Reason for Refusal dated May 24, 2022, by the Korean Patent Office in corresponding Korean Patent Application No. 10-2020-7037613, and an English translation of the Notification. (8 pages).
Notice of Office Action dated Oct. 17, 2022, by the Taiwan Intellectual Property Office of the Ministry of Economic Affairs in corresponding Taiwanese Patent Application No. 108120155 and an English translation of the Notice. (11 pages).
First Notification of Office Action dated Oct. 26, 2022, by the Patent Office of the People's Republic of China in corresponding Chinese Patent Application No. 201980038683.0 and an English translation of the Notification. (14 pages).
Office Action (Second Notification of Office Action) dated Feb. 2, 2023, by the Patent Office of the People's Republic of China in corresponding Chinese Patent Application No. 201980038683.0, and an English Translation of the Office Action. (17 pages).

* cited by examiner

US 11,773,208 B2

CATIONICALLY CURABLE COMPOSITION AND CURED PRODUCT PRODUCTION METHOD

TECHNICAL FIELD

The present invention relates to a cationic curable composition and a method for producing a cured product.

BACKGROUND ART

As a method for cationic curing of an epoxy resin, a method using a combination of an aluminum chelate compound and a silanol compound as a catalyst has been known. According to this method, the aluminum chelate compound and the silanol compound are reacted with each other to generate cationic curing initiation species to realize cationic curing.

One example of a technique associated with a latent curing agent using the above-described curing system is a method where an aluminum chelate compound is held in porous particles. Various techniques have been proposed about the latent curing agent and curable compositions using this (see, for example, PTLs 1 to 4).

These proposed techniques use a latent curing agent in which an aluminum chelate compound is held in porous particles, to thereby enhance storage stability and low-temperature rapid curability thereof.

In the above proposed techniques, however, when the latent curing agent and the silanol compound are mixed, the aluminum chelate compound exuded from the porous particles reacts with the silanol compound to generate cationic curing initiation species. Therefore, although the composition obtained by mixing them has excellent storage stability as compared with the case of using no latent curing agent, it has a problem with insufficiency in long-term storage.

On the other hand, as a technique of photocationic curing of an epoxy resin, a composition has been proposed in which a photodegradable organosilicon compound and an aluminum compound are mixed with an epoxy resin for the purpose of extending the pot life. This proposed composition is a photopolymerizable epoxy resin composition using, as the photodegradable organosilicon compound, a silicon compound having; at least one phenyl group having at least one fluorine atom; and at least one o-nitrobenzyloxy group which may have a substituent (see PTL 5).

However, this proposed technique has a problem that the working life after light irradiation is not sufficient because the reaction proceeds soon after the light irradiation. If the working life after the light irradiation is not sufficiently long, there will be difficulty in correcting the position of an object to be bonded or re-attaching in use as an adhesive.

At present, therefore, there is a demand to provide a cationic curable composition that can be stored for a long period of time, has excellent low-temperature rapid curability, and further has a long working life after light irradiation.

CITATION LIST

Patent Literature

PTL 1 Japanese Patent No. 5458596
PTL 2 Japanese Patent No. 5481013
PTL 3 Japanese Patent No. 5707662
PTL 4 Japanese Patent Application Laid-Open No. 2016-56274
PTL 5 Japanese Patent Application Laid-Open No. 01-103621

SUMMARY OF INVENTION

Technical Problem

The present invention aims to achieve the following object.

Specifically, an object of the present invention is to provide: a cationic curable composition that can be stored for a long period of time, has excellent low-temperature rapid curability, and further has a long working life after light irradiation; and a method for producing a cured product using the cationic curable composition.

Solution to Problem

Means for solving the problems are as follows. That is,
<1> A cationic curable composition that generates a silanol group by light irradiation and is cured by heat, the cationic curable composition including:
 a cationic curable component;
 porous particles holding an aluminum chelate; and
 a photodegradable silicon compound that generates a silanol group by photodegradation.
<2> The cationic curable composition according to <1>, wherein the photodegradable silicon compound has at least one selected from the group consisting of a peroxysilyl group, an o-nitrobenzyloxy group bonded directly to a silicon atom, and an α-ketosilyl group.
<3> The cationic curable composition according to <1> or <2>, wherein the porous particles include a polyurea resin.
<4> The cationic curable composition according to <3>, wherein the porous particles further include a vinyl resin as a constituting component thereof.
<5> The cationic curable composition according to any one of <1> to <4>, wherein the cationic curable component includes an epoxy resin.
<6> The cationic curable composition according to <5>, wherein the epoxy resin includes at least one selected from the group consisting of an alicyclic epoxy resin and a glycidyl ether-type epoxy resin.
<7> The cationic curable composition according to <5> or <6>, wherein the cationic curable component further includes an oxetane compound.
<8> The cationic curable composition according to any one of <1> to <7>, wherein a quantity of heat ($H_0$) generated in differential scanning calorimetry after light irradiation for 1 minute with a mercury xenon lamp at 50 mW/cm$^2$ and a quantity of heat ($H_{48}$) generated in the differential scanning calorimetry after 48 hours pass from the light irradiation satisfy formula (1) below:

$$-30 \leq [(H_0-H_{48})/H_0] \times 100 \leq 30 \qquad \text{Formula (1)}.$$

<9> The cationic curable composition according to any one of <1> to <8>, wherein a heat-generation onset temperature in differential scanning calorimetry after light irradiation for 1 minute with a mercury xenon lamp at 50 mW/cm$^2$ is 45° C. or higher but 80° C. or lower.
<10> The cationic curable composition according to any one of <1> to <9>, wherein an exothermic peak temperature in differential scanning calorimetry after light irradiation for 1 minute with a mercury xenon lamp at 50 mW/cm$^2$ is 60° C. or higher but 130° C. or lower.

<11> A method for producing a cured product, the method including:
irradiating the cationic curable composition according to any one of <1> to <10> with light to photodegrade the photodegradable silicon compound to generate the silanol group, followed by heating.
<12> The method according to <11>, wherein the heating is performed at 60° C. or higher but 180° C. or lower.

Advantageous Effects of Invention

According to the present invention, it is possible to achieve the above object, and provide: a cationic curable composition that can be stored for a long period of time, has excellent low-temperature rapid curability, and further has a long working life after light irradiation; and a method for producing a cured product using the cationic curable composition.

Figure 1:
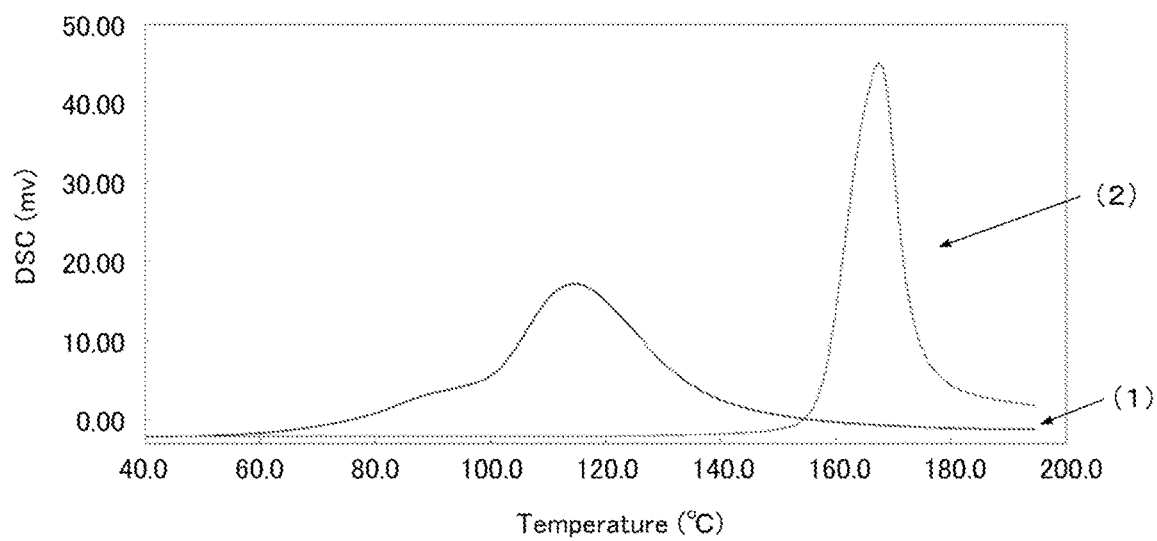
FIG. 1 is a chart presenting results of DSC of Formulation 1.

DESCRIPTION OF EMBODIMENTS (Cationic Curable Composition)
A cationic curable composition of the present invention includes a cationic curable component, porous particles, and a photodegradable silicon compound, and if necessary, further includes other components.
The cationic curable composition generates a silanol group by light irradiation and is cured by heat.
<Cationic Curable Component>
The cationic curable component is not particularly limited and may be appropriately selected depending on the intended purpose as long as the cationic curable component is an organic material that can be cured through cationic curing. Examples of the cationic curable component include an epoxy resin, an oxetane compound, and a vinyl ether resin.
<<Epoxy Resin>>
The epoxy resin is not particularly limited and may be appropriately selected depending on the intended purpose. Examples of the epoxy resin include an alicyclic epoxy resin and a glycidyl ether-type epoxy resin.
The alicyclic epoxy resin is not particularly limited and may be appropriately selected depending on the intended purpose. Examples of the alicyclic epoxy resin include vinyl cyclopentadiene dioxide, vinyl cyclohexhexene mono- or dioxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro[5.5]undecan-3-yl]-cyclohexane), 3,4-epoxycyclohexylmethyl-3',4'-epoxycyclohexane carborate, epoxy $C_{5-12}$ cycloalkyl $C_{1-3}$ alkyl-epoxy $C_{5-12}$ cycloalkane carboxylate (e.g., 4,5-epoxycyclooctylmethyl-4',5'-epoxycyclooctane carboxylate), and bis($C_{1-3}$ alkylepoxy $C_{5-12}$ cycloalkyl $C_{1-3}$-alkyl)dicarboxylate (e.g., bis(2-methyl-3,4-epoxycyclohexylmethyl)adipate).
As the alicyclic epoxy resin, 3,4-epoxycyclohexylmethyl-3',4'-epoxycyclohexane carboxylate [product name: CELLOXIDE #2021P, available from Daicel Corporation; epoxy equivalent: 128 to 140] is preferably used because a commercial product thereof is readily available.
Note that, in the list of the examples above, $C_{8-15}$, $C_{5-12}$, and $C_{1-3}$) respectively mean having 8 to 15 carbon atoms, having 5 to 12 carbon atoms, and having 1 to 3 carbon atoms, and indicate that there are variations in the structure of the compound.
Examples of the structural formula of the alicyclic epoxy resin are presented below.

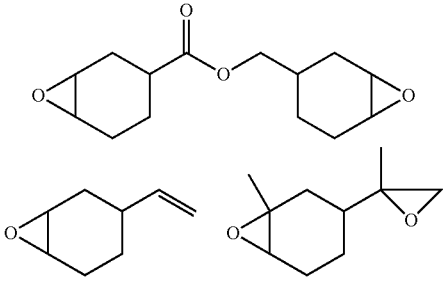

The glycidyl ether-type epoxy resin may be in the state of a liquid or a solid, for example. The epoxy equivalent of the glycidyl ether-type epoxy resin is typically from about 100 to about 4,000, and the glycidyl ether-type epoxy resin preferably includes two or more epoxy groups in a molecule thereof. Examples of the glycidyl ether-type epoxy resin include a bisphenol A-type epoxy resin, a bisphenol F-type epoxy resin, a phenol novolac-type epoxy resin, a cresol novolac-type epoxy resin, and an ester-type epoxy resin. Among the above-listed examples, a bisphenol A-type epoxy resin is preferably used in view of resin characteristics. Moreover, the above-listed epoxy resins include monomers and oligomers as well.
<<Oxetane Compound>>
An exothermic peak can be made sharp by using the oxetane compound in combination with the epoxy resin in the cationic curable composition.
Examples of the oxetane compound include 3-ethyl-3-hydroxymethyloxetane, 3-ethyl-3-{[(3-ethyloxetan-3-yl)methoxy]methyl}oxetane, 1,4-bis{[(3-ethyl-3-oxetanyl)methoxy]methyl}benzene, 4,4'-bis[(3-ethyl-3-oxetanyl)methoxymethyl]biphenyl, 1,4-benzenedicarboxylic acid bis[(3-ethyl-3-oxetanyl)]methyl ester, 3-ethyl-3-(phenoxymethyl)oxetane, 3-ethyl-3-(2-ethylhexloxymethyl)oxetane, di[1-ethyl(3-oxetanyl)]methyl ether, 3-ethyl-3-{[3-(triethoxysilyl)propoxy]methyl}oxetane, oxetanylsilsesquioxane, and phenol novolac oxetane.
The amount of the cationic curable component in the cationic curable composition is not particularly limited and may be appropriately selected depending on the intended purpose. The amount thereof is preferably 30% by mass or more but 99% by mass or less, more preferably 50% by mass or more but 98% by mass or less, particularly preferably 70% by mass or more but 97% by mass or less.
Note that, the amount is an amount in non-volatile components of the cationic curable composition. The same applies hereinafter.

The amount of the cationic curable component in the epoxy resin is not particularly limited and may be appropriately selected depending on the intended purpose. The amount thereof may be, for example, 80% by mass or more or 90% by mass or more.

The amount of the oxetane compound in the cationic curable component is not particularly limited and may be appropriately selected depending on the intended purpose. The amount thereof may be, for example, more than 0% by mass but 20% by mass or less, 15% by mass or less, 10% by mass or less.

<Porous Particles>

The porous particles hold an aluminum chelate.

The porous particles are not particularly limited and may be appropriately selected depending on the intended purpose as long as they have a large number of pores. Examples thereof include porous organic resin particles including an organic resin.

The porous particles hold the aluminum chelate in the pores thereof, for example. In other words, the aluminum chelate is incorporated and held in the fine pores existing in the porous particle matrix.

The average pore diameter of the pores of the porous particles is not particularly limited and may be appropriately selected depending on the intended purpose. The average pore diameter thereof is preferably from 1 nm to 300 nm, more preferably from 5 nm to 150 nm.

<<Porous Organic Resin Particles>>

The porous organic resin particles are not particularly limited and may be appropriately selected depending on the intended purpose as long as the porous organic resin particles are porous particles including an organic resin.

The organic resin is not particularly limited and may be appropriately selected depending on the intended purpose. The organic resin is preferably a polyurea resin. Specifically, the porous organic resin particles preferably include at least a polyurea resin.

The porous organic resin particles may further include a vinyl resin as a constituting component thereof.

<<<Polyurea Resin>>>

The polyurea resin is a resin including a urea bond in the resin thereof.

For example, the polyurea resin constituting the porous organic resin particles can be obtained by polymerizing a polyfunctional isocyanate compound in an emulsion. The polyurea resin may include, in the resin thereof, a bond that is derived from an isocyanate group and is not a urea bond, for example, a urethane bond.

The porous particles including the polyurea resin have excellent thermal response as compared with the case where the porous particles include porous inorganic particles such as silica.

<<<Vinyl Resin>>>

The vinyl resin is a resin obtained through polymerization of a radical-polymerizable vinyl compound.

The vinyl resin improves mechanical characteristics of the porous particles. Use of the vinyl resin can impart thermal response to a cationic curable component at the time of curing, particularly, sharp thermal response in a low temperature region.

For example, the vinyl resin can be obtained by adding a radical-polymerizable vinyl compound to an emulsified oil phase including a polyfunctional isocyanate compound, and performing radical polymerization of the radical-polymerizable vinyl compound at the same time as when the polyfunctional isocyanate compound is polymerized in the emulsified oil phase.

The average particle diameter of the porous organic resin particles is not particularly limited and may be appropriately selected depending on the intended purpose. The average particle diameter thereof is preferably 0.5 μm or greater but 20 μm or less, more preferably 1 μm or greater but 10 μm or less, particularly preferably 1 μm or greater but 5 μm or less.

<<Aluminum Chelate>>

Examples of the aluminum chelate include complex compounds represented by the following General Formula (A) in which three β-ketoenolate anions are coordinated with aluminum. Here, the alkoxy group is not directly bonded to aluminum. This is because when the alkoxy group is directly bonded thereto, the resultant is easily hydrolyzed and is not suitable for emulsifying treatment when producing the porous particles.

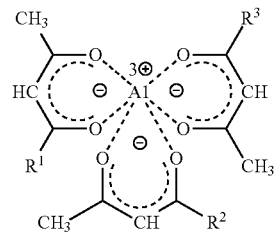

General Formula (A)

In the General Formula (A), $R^1$, $R^2$, and $R^3$ each independently represent an alkyl group or an alkoxyl group.

Examples of the alkyl group include a methyl group and an ethyl group.

Examples of the alkoxyl group include a methoxy group, an ethoxy group, and an oleyloxy group.

Examples of the complex compound represented by the General Formula (A) include aluminum tris(acetylacetonate), aluminum tris(ethylacetoacetate), aluminum monoacetylacetonate bis(ethylacetoacetate), and aluminum monoacetylacetonate bis(oleyl acetoacetate).

The amount of the aluminum chelate in the porous particles is not particularly limited and may be appropriately selected depending on the intended purpose.

<<Surfaces of Porous Particles>>

The porous particles preferably include a reaction product of an alkoxysilane coupling agent on the surfaces thereof for the purpose of enhancing latency.

The reaction product is obtained through reaction of an alkoxysilane coupling agent.

The reaction product is present on the surfaces of the porous particles.

The amount of the porous particles is not particularly limited and may be appropriately selected depending on the intended purpose. The amount thereof is preferably 20% by mass or less, more preferably 0.1% or greater but 20% by mass or less, particularly preferably 1% by mass or more but 10% by mass or less, relative to the cationic curable component.

The amount of the porous particles in the cationic curable composition is not particularly limited and may be appropriately selected depending on the intended purpose. The amount thereof is preferably 0.1% by mass or more but 20% by mass or less, more preferably 0.5% by mass or more but 15% by mass or less.

<<Method for Producing Porous Particles>>

A method for producing the porous particles holding the aluminum chelate is not particularly limited and may be appropriately selected depending on the intended purpose.

A method for producing the porous inorganic particles holding the aluminum chelate is, for example, a method including impregnating the porous inorganic particles in a liquid containing the aluminum chelate to charge the pores of the porous inorganic particles with the aluminum chelate.

A method for producing the porous organic resin particles holding the aluminum chelate is, for example, the following production method.

<<<Method of Producing Porous Organic Resin Particles>>>

The method for producing the porous organic resin particles includes, for example, a porous particle producing step and if necessary, further includes other steps such as a deactivating step.

—Porous Particle Producing Step—

The porous particle producing step includes an emulsion preparation treatment and a polymerization treatment, preferably includes an additional charging treatment, and if necessary, further includes other treatments.

—Emulsion Preparation Treatment—

The emulsion preparation treatment is not particularly limited and may be appropriately selected depending on the intended purpose as long as it is a treatment of obtaining an emulsion by emulsifying a liquid obtained by mixing an aluminum chelate and a polyfunctional isocyanate compound, and preferably an organic solvent. The emulsion preparation treatment can be performed using, for example, a Homogenizer.

When the resin constituting the porous particles contains not only a polyurea resin but also a vinyl resin, the liquid further contains a radical-polymerizable vinyl compound and a radical polymerization initiator.

The aluminum chelate is, for example, the aluminum chelate in the description of the porous particles.

The size of oil droplets in the emulsion is not particularly limited and may be appropriately selected depending on the intended purpose. The size thereof is preferably 0.5 μm or more but 100 μm or less.

—Polyfunctional Isocyanate Compound—

The polyfunctional isocyanate compound is a compound including, in a molecule thereof, 2 or more isocyanate groups, preferably 3 or more isocyanate groups.

Examples of the polyfunctional isocyanate compound include difunctional isocyanate compounds and trifunctional isocyanate compounds.

Preferable examples of the trifunctional isocyanate compounds include: a TMP adduct represented by the following General Formula (2) obtained by allowing 1 mole of trimethylol propane and 3 moles of a diisocyanate compound to react together; an isocyanurate body represented by the following General Formula (3) obtained by self-condensing 3 moles of a diisocyanate compound; and a burette body represented by the following General Formula (4) obtained by, among 3 moles of a diisocyanate compound, condensing 1 mole of the diisocyante to diisocyanate urea obtained from 2 moles of the diisocyanate.

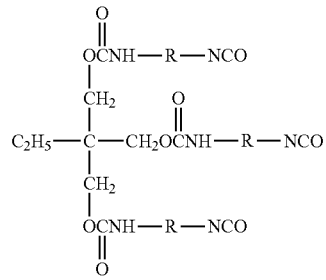

General Formula (2)

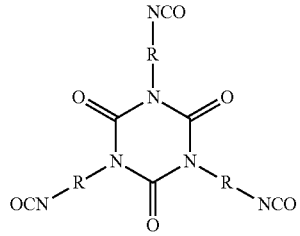

General Formula (3)

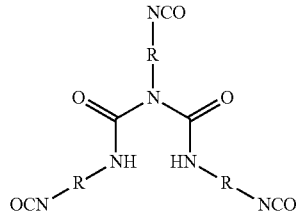

General Formula (4)

In the General Formulae (2) to (4), a substituent R is a site in which isocyanate groups are removed from diisocyanate compounds. Specific examples of the diisocyanate compounds include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylenediphenyl-4,4'-diisocyanate.

Examples of the difunctional isocyanate compounds include tolylene diisocyanate, xylylene diisocyanate, naphthylene 1,5-diisocyanate, tetramethylxylene diisocyanate, isophorone diisocyanate, hydrogenated xylylene diisocyanate, dicyclohexylmethane diisocyanate, hexamethylene diisocyanate, dimer acid diisocyanate, norbornene diisocyanate, trimethylhexamethylene diisocyanate, methylene diphenyl diisocyanate, dichlorobiphenyl diisocyanate, phenylene diisocyanate, and tetramethylene diisocyanate.

The formulation ratio of the aluminum chelate and the polyfunctional isocyanate compound is not particularly limited and may be appropriately selected depending on the intended purpose. When the formulation amount of the aluminum chelate is too small, the cationic curable component to cure is degraded in curability. When it is too large, the resultant latent curing agent has poor latency. In view thereof, the amount of the aluminum chelate is preferably 10 parts by mass or more but 500 parts by mass or less, more preferably 10 parts by mass or more but 300 parts by mass or less, relative to 100 parts by mass of the polyfunctional isocyanate compound.

—Organic Solvent—

The organic solvent is not particularly limited and may be appropriately selected depending on the intended purpose. The organic solvent is preferably a volatile organic solvent.

Preferably, the organic solvent is a good solvent for each of the aluminum chelate, the polyfunctional isocyanate compound, the radical-polymerizable vinyl compound, and the radical polymerization initiator (the solubility thereof is preferably equal to or higher than 0.1 g/ml (organic solvent)), does not substantially dissolve in water (the solubility of water is equal to or higher than 0.5 g/ml (organic solvent)), and has a boiling point of 100° C. or lower under the atmospheric pressure. Specific examples of the volatile organic solvent include alcohols, acetic acid esters, and ketones. Among them, ethyl acetate is preferable in terms of high polarity, low boiling point, and poor water solubility.

The amount of the organic solvent used is not particularly limited and may be appropriately selected depending on the intended purpose.

—Radical-Polymerizable Vinyl Compound—

The radical-polymerizable vinyl compound is a compound including a radical-polymerizable carbon-carbon unsaturated bond in a molecule thereof.

The radical-polymerizable vinyl compound includes a so-called monofunctional radical-polymerizable compound and polyfunctional radical-polymerizable compound.

The radical-polymerizable vinyl compound preferably includes a polyfunctional radical-polymerizable compound. This is because use of the polyfunctional radical-polymerizable compound easily realizes sharp thermal response in a low temperature region. From the point as mentioned, the radical-polymerizable vinyl compound preferably includes a polyfunctional radical-polymerizable compound in an amount of 30% by mass or more, more preferably 50% by mass or more.

Examples of the monofunctional radical-polymerizable compound include monofunctional vinyl-based compounds (e.g., styrene and methylstyrene) and monofunctional (meth) acrylate-based compound (e.g., butyl acrylate).

Examples of the polyfunctional radical-polymerizable compounds include polyfunctional vinyl-based compounds (e.g., divinylbenzene and divinyl adipate) and polyfunctional (meth)acrylate-based compounds (e.g., 1,6-hexanediol diacrylate, trimethylolpropane triacrylate, and polyethylene glycol diacrylate). The polyethylene glycol diacrylate is, for example, polyethylene glycol diacrylate represented by the following General Formula (B):

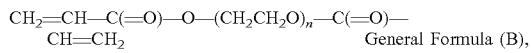

CH$_2$=CH—C(=O)—O—(CH$_2$CH$_2$O)$_n$—C(=O)—CH=CH$_2$    General Formula (B), where in the General Formula (B), n represents an integer of from 2 to 10.

Among the above-listed examples, a polyfunctional vinyl-based compound, particularly divinylbenzene, can be used in view of latency and thermal response.

Among them, polyethylene glycol diacrylate can be used preferably, and the polyethylene glycol diacrylate represented by the General Formula (B) can be used more preferably, because the longer distance between the cross-linking points makes it easier to additionally charge the porous particles with the aluminum chelate in the additional charging treatment to be able to charge the porous particles with the aluminum chelate in a larger amount; i.e., to be able to lower the curing start temperature.

Note that, a polyfunctional radical-polymerizable compound may be formed from a polyfunctional vinyl-based compound and a polyfunctional (meth)acrylate-based compound. Use of the polyfunctional vinyl-based compound and the polyfunctional (meth)acrylate-based compound in combination can achieve an effect of varying thermal response or introducing a reactive functional group.

The formulation amount of the radical-polymerizable vinyl compound is not particularly limited and may be appropriately selected depending on the intended purpose. The amount thereof is preferably 1 part by mass or more but 80 parts by mass or less, more preferably 10 parts by mass or more but 60 parts by mass or less, relative to 100 parts by mass of the polyfunctional isocyanate compound.

—Radical Polymerization Initiator—

Examples of the radical polymerization initiator include peroxide initiators and azo initiators.

The formulation amount of the radical polymerization initiator is not particularly limited and may be appropriately selected depending on the intended purpose. The formulation amount thereof is preferably from 0.1 parts by mass to 10 parts by mass, more preferably from 0.5 parts by mass to 5 parts by mass, relative to 100 parts by mass of the radical-polylmerizable vinyl compound.

—Polymerization Treatment—

The polymerization treatment is not particularly limited and may be appropriately selected depending on the intended purpose as long as it is a treatment of polymerizing the polyfunctional isocyanate compound in the emulsion to obtain porous particles.

The porous particles hold the aluminum chelate.

In the polymerization treatment, part of the isocyanate group of the polyfunctional isocyanate compound is hydrolyzed into an amino group, and the amino group reacts with the isocyanate group of the polyfunctional isocyanate compound to form a urea bond, whereby a polyurea resin is obtained. Here, when the polyfunctional isocyanate compound has a urethane bond, the resultant polyurea resin also has the urethane bond. In this sense, the resultant polyurea resin may also be referred to as a polyurea urethane resin.

Further, when the emulsion contains the radical-polymerizable vinyl compound and the radical polymerization initiator, in the polymerization treatment, the polyfunctional isocyanate compound is polymerized and at the same time the radical-polylmerizable vinyl compound is radically polymerized in the presence of the radical polymerization initiator.

Therefore, the resultant porous particles contain a polyurea resin and a vinyl resin as constituting resins thereof.

The polymerization time in the polymerization treatment is not particularly limited and may be appropriately selected depending on the intended purpose. The polymerization time is preferably 1 hour or longer but 30 hours or shorter, more preferably 2 hours or longer but 10 hours or shorter.

The polymerization temperature in the polymerization treatment is not particularly limited and may be appropriately selected depending on the intended purpose. The polymerization temperature is preferably 30° C. or higher but 90° C. or lower, more preferably 50° C. or higher but 80° C. or lower.

—Additional Charging Treatment—

The additional charging treatment is not particularly limited and may be appropriately selected depending on the intended purpose as long as it is a treatment of additionally charging an aluminum chelate into the porous particles obtained in the polymerization treatment. One exemplary method for the additional charging treatment includes impregnating the porous particles in a solution obtained by dissolving an aluminum chelate in an organic solvent and then removing the organic solvent from the solution.

The additional charging treatment increases the amount of the aluminum chelate held in the porous particles. The porous particles additionally charged with the aluminum chelate may be, if necessary, separated through filtration, washed, and dried, and then cracked into primary particles with a known cracking machine.

The aluminum chelate additionally charged in the additional charging treatment may be identical to or different from the aluminum chelate added to the liquid to become the emulsion. For example, because no water is used in the additional charging treatment, the aluminum chelate used in the additional charging treatment may be an aluminum chelate where an alkoxy group is bonded to aluminum. Examples of the aluminum chelate include diisopropoxy aluminum monooleyl acetoacetate, monoisopropoxy aluminum bis(oleyl acetoacetate), monoisopropoxy aluminum monooleate monoethyl acetoacetate, diisopropoxy aluminum monolauryl acetoacetate, diisopropoxy aluminum monostearyl acetoacetate, diisopropoxy aluminum monoisostearyl acetoacetate, and monoisopropoxy aluminum mono-N-lauroyl-β-alanate monolauryl acetoacetate.

The organic solvent is not particularly limited and may be appropriately selected depending on the intended purpose. Examples thereof include the organic solvents exemplified in the description of the emulsion preparation treatment. Preferable aspects thereof are also the same.

A method for removing the organic solvent from the solution is not particularly limited and may be appropriately selected depending on the intended purpose. Examples thereof include a method of heating the solution at a temperature equal to or higher than the boiling point of the organic solvent, and a method of reducing the solution in pressure.

The amount of the aluminum chelate in the solution obtained by dissolving the aluminum chelate in the organic solvent is not particularly limited and may be appropriately selected depending on the intended purpose. The amount thereof is preferably 10% by mass or more but 80% by mass or less, more preferably 10% by mass or more but 50% by mass or less.

—Deactivating Step—

The deactivating step is not particularly limited and may be appropriately selected depending on the intended purpose as long as it is a step of imparting a reaction product of an alkoxysilane coupling agent on the surfaces of the porous particles. For example, the deactivating step is preferably performed by impregnating the porous particles in a solution containing an alkoxysilane coupling agent and an organic solvent, and allowing the alkoxysilane coupling agent to react.

It is assumed that the porous particles result to contain the aluminum chelate present not only the inside thereof but also the surfaces thereof, considering their structures. In interfacial polymerization, however, much of the aluminum chelate on the surfaces is deactivated by water present in the polymerization system. As a result, the porous particles can have latency without requiring the deactivating step (in other words, even if their surfaces do not have the reaction product of the alkoxysilane coupling agent).

Meanwhile, when an alicyclic epoxy resin having high reactivity is used as an epoxy resin, usually, the cationic curable composition using a latent curing agent not having undergone the deactivating step becomes greatly thicker over time. In view thereof, it is considered that part of the aluminum chelate on the surfaces of the porous particles is not deactivated but is maintained to be active.

In the cationic curable composition of the present invention, the photodegradable silicon compound does not generate a silanol group without being irradiated with light. This makes it possible to control cationic curing of the cationic curable components over time even in the case of using porous particles (a latent curing agent) not having undergone the deactivating step.

—Alkoxysilane Coupling Agent—

The alkoxysilane coupling agent is classified into two types as described below.

A first type of the alkoxysilane coupling agent is a silane coupling agent that reacts with the active aluminum chelate on the surfaces of the porous particles to form aluminum chelate-silanol reaction products, thereby reducing activity by lowering the electron density of the oxygen adjacent to the aluminum atom (in other words, by lowering the acidity of the hydrogen bonded to the oxygen or by lowering the polarizability between the oxygen and the hydrogen). The silane coupling agent of this type is, for example, an alkoxysilane coupling agent where an electron-donating group is bonded to a silicon atom, preferably an alkylalkoxysilane coupling agent having an alkyl group. Specific examples thereof include methyltrimethoxysilane, n-propyltrimethoxysilane, and hexyltrimethoxysilane.

A second type of the alkoxysilane coupling agent is a silane coupling agent that allows epoxy groups in a molecule thereof to react with the active aluminum chelate of the porous particles to produce an epoxy polymer chain and cover the surfaces of the porous particles with the epoxy polymer chain to reduce activity. Specific examples thereof include 2-(3,4-epoxycyclohexyl)ethyltrimethoxysilane (KBM-303, available from Shin-Etsu Chemical Co., Ltd.) and 3-glycidoxypropyltrimethoxysilane (KBM-403, available from Shin-Etsu Chemical Co., Ltd.).

—Organic Solvent—

The organic solvent is not particularly limited and may be appropriately selected depending on the intended purpose. The organic solvent is preferably a non-polar solvent. Examples of the non-polar solvent include hydrocarbon-based solvents. Examples of the hydrocarbon-based solvents include toluene, xylene, hexane, and cyclohexane.

The amount of the alkoxysilane coupling agent in the solution is not particularly limited and may be appropriately selected depending on the intended purpose. The amount thereof is preferably from 5% by mass or more but 80% by mass or less.

The temperature of the solution in the deactivating step is not particularly limited and may be appropriately selected depending on the intended purpose. In terms of preventing aggregation of the porous particles and outflow of the aluminum chelate from the porous particles, the temperature thereof is preferably 10° C. or higher but 80° C. or lower, more preferably 20° C. or higher but 60° C. or lower.

The time of the impregnating in the deactivating step is not particularly limited and may be appropriately selected depending on the intended purpose. The time thereof is preferably 1 hour or longer but 48 hours or shorter, more preferably 5 hours or longer but 30 hours or shorter.

In the deactivating step, the solution is preferably stirred.

The latent curing agent obtained after the deactivation step may be, if necessary, separated through filtration, washed, and dried, and then cracked into primary particles with a known cracking machine.

<Photodegradable Silicon Compound>

The photodegradable silicon compound is not particularly limited and may be appropriately selected depending on the intended purpose as long as it is a silicon compound that generates a silanol group by photodegradation through light irradiation.

The photodegradable silicon compound contains, for example, a peroxysilyl group, an o-nitrobenzyloxy group bonded directly to a silicon atom, or an α-ketosilyl group, as a group for generating a silanol group by photodegradation.

<<Photodegradable Silicon Compound Containing Peroxysilyl Group>>

The photodegradable silicon compound containing the peroxysilyl group is, for example, a silicon compound represented by the following General Formula (I):

   General Formula (I), where in the General Formula (I), $R^1$ and $R^2$, which may be identical or different, each represent a hydrogen atom, a halogen atom, an unsubstituted or substituted alkyl group having from 1 to 5 carbon atoms, or an unsubstituted or substituted aryl group. n represents an integer of from 0 to 3.

Examples of the unsubstituted or substituted alkyl group having from 1 to 5 carbon atoms include a methyl group, an ethyl group, an isopropyl group, a n-propyl group, a n-butyl group, a t-butyl group, a sec-butyl group, a n-pentyl group, a methoxy group, an ethoxy group, and a chloromethyl group.

Examples of the unsubstituted or substituted aryl group include a phenyl group, a naphthyl group, an anthranyl group, a p-methoxyphenyl group, and a p-chlorophenyl group.

Examples of the photodegradable silicon compound containing the peroxysilyl group include the following compounds.
tert-Butylperoxytriphenylsilane
tert-Butylperoxydimethylphenylsilane
tert-Butylperoxymethyldiphenylsilane
tert-Butylperoxymethylvinylphenylsilane
tert-Butylperoxydimethylvinylsilane
Di-(tert-butylperoxy)diphenylsilane
Di-(tert-butylperoxy)methylphenylsilane
Di-(tert-butylperoxy)vinylphenylsilane
1,1-Dimethylpropylperoxytriphenylsilane
1-Methylethylperoxytriphenylsilane
Di(1-methylethylperoxy)diphenylsilane
Di(1,1-dimethylpropylperoxy)diphenylsilane A method for synthesizing the photodegradable silicon compound containing the peroxysilyl group is not particularly limited and may be appropriately selected depending on the intended purpose.

<<Photodegradable Silicon Compound Containing o-Nitrobenzyloxy Group Bonded Directly to Silicon Atom>>

Examples of the photodegradable silicon compound containing the o-nitrobenzyloxy group bonded directly to the silicon atom include silicon compounds represented by the following General Formula (II).

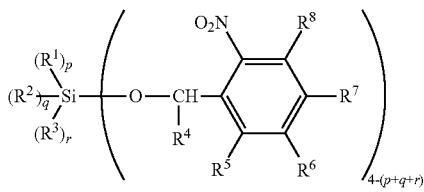   General Formula (II)

In the General Formula (II), $R^1$, $R^2$, and $R^3$, which may be identical or different, each represent a hydrogen atom, a halogen atom, a vinyl group, an allyl group, an unsubstituted or substituted alkyl group having from 1 to 10 carbon atoms, an unsubstituted or substituted alkoxy group having from 1 to 10 carbon atoms, an unsubstituted or substituted aryl group, an unsubstituted or substituted aryloxy group, or a siloxy group. $R^4$ represents a hydrogen atom, an unsubstituted or substituted alkyl group having from 1 to 10 carbon atoms, or an unsubstituted or substituted phenyl group. $R^5$, $R^6$, $R^7$, and $R^8$, which may be identical or different, each represent a hydrogen atom, a nitro group, a cyano group, a hydroxy group, a mercapto group, a halogen atom, an acetyl group, an allyl group, an unsubstituted or substituted alkyl group having from 1 to 5 carbon atoms, an unsubstituted or substituted alkoxy group having from 1 to 5 carbon atoms, an unsubstituted or substituted aryl group, or an unsubstituted or substituted aryloxy group. p, q, and r represent integers that satisfy conditions: $0 \leq p \leq 3$, $0 \leq q \leq 3$, $0 \leq r \leq 3$, and $1 \leq p+q+r \leq 3$.

Examples of the unsubstituted or substituted alkyl group having from 1 to 10 carbon atoms include a methyl group, an ethyl group, a propyl group, a butyl group, a t-butyl group, a pentyl group, a chloromethyl group, a chloroethyl group, a fluoromethyl group, and a cyanomethyl group.

Examples of the unsubstituted or substituted alkoxy group having from 1 to 10 carbon atoms include a methoxy group, an ethoxy group, a n-propoxy group, and a n-butoxy group.

Examples of the unsubstituted or substituted aryl group include a phenyl group, a p-methoxyphenyl group, and a p-chlorophenyl group.

Examples of the photodegradable silicon compound containing the o-nitrobenzyloxy group bonded directly to the silicon atom include the following compounds.
p-Trifluoromethylphenylvinylmethylphenyl(o-nitrobenzyloxy)silane
t-Butylmethylphenyl(o-nitrobenzyloxy)silane
Triethyl(o-nitrobenzyloxy)silane
Tri(2-chloroethyl)-o-nitrobenzyloxysilane
Tri(p-trifluoromethylphenyl)-o-nitrobenzyloxysilane
Trimethyl[α-(o-nitrophenyl)-o-nitrobenzyloxy]silane
Dimethylphenyl[α-(o-nitrophenyl)-o-nitrobenzyloxy]silane
Methylphenyldi[α-(o-nitrophenyl)-o-nitrobenzyloxy]silane
Triphenyl(α-ethyl-o-nitrobenzyloxy)silane
Trimethyl(3-methyl-2-nitrobenzyloxy)silane
Dimethylphenyl(3,4,5-trimethoxy-2-nitrobenzyloxy)silane
Triphenyl(4,5,6-trimethoxy-2-nitrobenzyloxy)silane
Diphenylmethyl(5-methyl-4-methoxy-2-nitrobenzyloxy)silane
Triphenyl(4,5-dimethyl-2-nitrobenzyloxy)silane
Vinylmethylphenyl(4,5-dichloro-2-nitrobenzyloxy)silane
Triphenyl(2,6-dinitrobenzyloxy)silane
Diphenylmethyl(2,4-nitrobenzyloxy)silane
Triphenyl(3-methoxy-2-nitrobenzyloxy)silane
Vinylmethylphenyl(3,4-dimethoxy-2-nitrobenzyloxy)silane
Dimethyldi(o-nitrobenzyloxy)silane
Methylphenydi(o-nitrobenzyloxy)silane
Vinylphenyldi(o-nitrobenzyloxy)silane
t-Butylphenyldi(o-nitrobenzyloxy)silane
Diethyldi(o-nitrobenzyloxy)silane
2-Chloroethylphenydi(o-nitrobenzyloxy)silane
Diphenyldi(o-nitrobenzyloxy)silane
Diphenyldi(3-methoxy-2-nitrobenzyloxy)silane
Diphenyldi(3,4-dimethoxy-2-nitrobenzyloxy)silane
diphenyldi(2,6-dinitrobenzyloxy)silane
Diphenyldi(2,4-dinitrobenzyloxy)silane
Methyltri(o-nitrobenzyloxy)silane
Phenyltri(o-nitrobenzyloxy)silane
p-Bis(o-nitrobenzyloxydimethylsilyl)benzene
1,1,3,3-Tetraphenyl-1,3-di(o-nitrobenzyloxy)siloxane
1,1,3,3,5,5-Hexaphenyl-1,5-di(o-nitrobenzyloxy)siloxane A method for synthesizing the photodegradable silicon compound containing the o-nitrobenzyloxy group bonded directly to the silicon atom is not particularly limited and may be appropriately selected depending on the intended purpose. Reference can be made to the method described in Japanese Patent Application Laid-Open No. 58-174389, for example.

<<Photodegradable Silicon Compound Containing α-Ketosilyl Group>>

Examples of the photodegradable silicon compound containing the α-ketosilyl group include silicon compounds represented by the following General Formula (III).

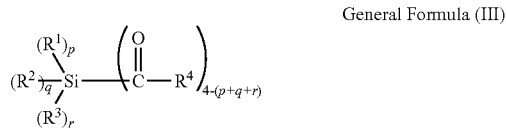

General Formula (III)

In the General Formula (III), $R^1$, $R^2$, $R^3$, and $R^4$, which may be identical or different, each represent an unsubstituted or substituted alkyl group having from 1 to 10 carbon atoms, an unsubstituted or substituted aryl group, an allyl group, a vinyl group, an unsubstituted or substituted aryloxy group, or an unsubstituted or substituted alkoxy group having from 1 to 10 carbon atoms. p, q, and r represent integers that satisfy conditions: $0 \leq p \leq 3$, $0 \leq q \leq 3$, $0 \leq r \leq 3$, and $1 \leq p+q+r \leq 3$.

Examples of the unsubstituted or substituted alkyl group having from 1 to 10 carbon atoms include a methyl group, an ethyl group, a propyl group, a butyl group, a t-butyl group, a pentyl group, a chloromethyl group, a chloroethyl group, a fluoromethyl group, and a cyanomethyl group.

Examples of the unsubstituted or substituted aryl group include a phenyl group, a p-methoxyphenyl group, and a p-chlorophenyl group.

Examples of the unsubstituted or substituted alkoxy group having from 1 to 10 carbon atoms include a methoxy group, an ethoxy group, a n-propoxy group, and a n-butoxy group.

Examples of the photodegradable silicon compound containing the α-ketosilyl group include the following compounds.

Benzoyltriphenylsilane
Benzoylmethyldiphenylsilane
Benzoyldimethylphenylsilane
Acetyltriphenylsilane
Propionyltriphenylsilane
Acetylmethyldiphenylsilane
Benzoyltrimethylsilane
Benzoylmethoxydiphenylsilane A method for synthesizing the photodegradable silicon compound containing the α-ketosilyl group is not particularly limited and may be appropriately selected depending on the intended purpose.

The amount of the photodegradable silicon compound in the cationic curable composition is not particularly limited and may be appropriately selected depending on the intended purpose. The amount thereof is preferably 0.5% by mass or more but 30% by mass or less, more preferably 1% by mass or more but 25% by mass or less, particularly preferably 3% by mass or more but 20% by mass or less.

In the cationic curable composition, when a quantity of heat ($H_O$) generated in differential scanning calorimetry after light irradiation for 1 minute with a mercury xenon lamp at 50 mW/cm² and a quantity of heat ($H_{48}$) generated in the differential scanning calorimetry after 48 hours pass from the light irradiation satisfy formula (1) below, the working life after light irradiation is more excellent, which is preferable.

$$-30 \leq [(H_O - H_{48})/H_O] \times 100 \leq 30 \qquad \text{Formula (1)}.$$

The differential scanning calorimetry is performed at a heating rate of 10° C./min, for example.

The measurement of the quantity of heat ($H_O$) is performed immediately after the light irradiation (e.g., within 1 hour).

The measurement of the quantity of heat ($H_{48}$) is performed after being left to stand for 48 hours from the light irradiation under an environment of 25° C. (e.g., humidity 65% RH).

In the cationic curable composition, the heat-generation onset temperature in differential scanning calorimetry after the light irradiation for 1 minute with a mercury xenon lamp at 50 mW/cm² is preferably 45° C. or higher but 80° C. or lower, in terms of curability at a low temperature.

In the cationic curable composition, the exothermic peak temperature in differential scanning calorimetry after the light irradiation for 1 minute with a mercury xenon lamp at 50 mW/cm² is preferably 60° C. or higher but 130° C. or lower, in terms of curability at a low temperature.

The differential scanning calorimetry is performed at a heating rate of 10° C./min, for example.

The differential scanning calorimetry is performed, for example, immediately after the light irradiation (e.g., within 1 hour).

In the cationic curable composition, the amount of anions in the cured product is preferably 100 ppm by mass or less, more preferably 50 ppm by mass or less, particularly preferably 20 ppm by mass or less, in terms of corrosion and electrical insulation after curing.

Examples of the anions include carbonate ions, hydroxide ions, and halogen ions.

Examples of the halogen ions include fluoride ions, chloride ions, and bromide ions.

The amount of the anions in the cured product can be determined through ion chromatography using the cured product or quantification of cations that are counter ions of the anions.

The quantification of cations can be performed by, for example, inductively coupled plasma (ICP) analysis, atomic absorption spectrometry, or ion chromatography.

The ICP analysis is performed under the following conditions, for example.

Analysis method: inductively coupled plasma-mass spectrometry (ICP-MS)

Solvent: N-methyl-2-pyrrolidone (NMP)

(Method for Producing Cured Product)

A method of the present invention for producing a cured product includes irradiating the cationic curable composition of the present invention with light to photodegrade the photodegradable silicon compound to generate the silanol group, followed by heating.

The light is preferably light containing ultraviolet rays. A light source of such light is, for example, a mercury xenon lamp.

The irradiation intensity in irradiating the light is not particularly limited and may be appropriately selected depending on the intended purpose. The irradiation intensity may be, for example, 1 mW/cm² or higher but 200 mW/cm² or lower, or 10 mW/cm² or higher but 100 mW/cm² or lower.

The irradiation time in irradiating the light is not particularly limited and may be appropriately selected depending on the intended purpose. The irradiation time may be, for example, 1 second or longer but 10 minutes or shorter, or 30 seconds or longer but 5 minutes or shorter.

The heating is preferably heating it to a temperature of 60° C. or higher but 180° C. or lower because sufficient curing is possible.

The heating time is not particularly limited and may be appropriately selected depending on the intended purpose. The heating time may be, for example, 1 minute or longer but 10 hours or shorter, 10 minutes or longer but 5 hours or shorter, or 30 minutes or longer but 2 hours or shorter.

EXAMPLES

The present invention will be described by way of Example, but these Examples shall not be construed as limiting the present invention.

Production Example 1

<Production of Capsule-Type Catalyst 1 (Porous Particles Holding Aluminum Chelate)>
<<Preparation of Polymerized Particles>>

800 parts by mass of distilled water, 0.05 parts by mass of a surfactant (NEWREX R-T, NOF CORPORATION), and 4 parts by mass of polyvinyl alcohol (PVA-205, KURARAY CO., LTD) serving as a dispersant were charged into a 3-liter interfacial polymerization vessel equipped with a thermometer, followed by homogeneously mixing, to prepare an aqueous phase.

To this aqueous phase was further added an oil phase prepared by dissolving, in 100 parts by mass of ethyl acetate, 100 parts by mass of 24% by mass isopropanol solution of aluminum monoacetylacetonate bis(ethylacetoacetate) (ALUMICHELATE D, Kawaken Fine Chemicals Co., Ltd.), 70 parts by mass of trimethylolpropane (1 mol) adduct of methylenediphenyl-4,4'-diisocyanate (3 mol) (D-109, Mitsui Chemicals, Inc.) as a polyfunctional isocyanate compound, 30 parts by mass of divinylbenzene (Merck Co.) as a radical-polymerizable compound, and a radical polymerization initiator (PEROYL L, NOF CORPORATION) in an amount (0.3 parts by mass) equivalent to 1% by mass of the radical-polymerizable compound. The resultant mixture was mixed for emulsification with a Homogenizer (10000 rpm/5 min: T-50, IKA Japan Co.) and then was allowed to undergo interfacial polymerization and radical polymerization at 80° C. for 6 hours. After completion of reaction, the polymerization reaction liquid was left to cool to room temperature, and polymerized particles were separated through filtration.

<<Preparation of Impregnation Liquid>>

15 parts by mass of 24% by mass isopropanol solution of aluminum monoacetylacetonate bis(ethylacetoacetate) (ALUMICHELATE D, Kawaken Fine Chemicals Co., Ltd.) and 25 parts by mass of aluminum tris(ethylacetoacetate) (ALCH-TR, Kawaken Fine Chemicals Co., Ltd.), and 60 parts by mass of ethyl alcohol were mixed to prepare an impregnation liquid.

<<Impregnation>>

The obtained polymerized particles were added to the impregnation liquid. The resultant mixture was stirred at a stirring rate of 200 rpm, at 30° C., and for 6 hours, followed by filtration. After that, the resultant was air dried to obtain solid catalyst particles. The solid catalyst particles after drying were cracked with AO-JET MILL (SEISHIN ENTERPRISE CO., LTD.) into primary particles, whereby capsule-type catalyst 1 was obtained.

Production Example 2

<Production of Capsule-Type Catalyst 2 (Porous Particles Holding Aluminum Chelate)>
<<Preparation of Polymerized Particles>>

To the aqueous phase prepared in Production Example 1 was further added an oil phase prepared by dissolving, in 100 parts by mass of ethyl acetate, 100 parts by mass of 24% by mass isopropanol solution of aluminum monoacetylacetonate bis(ethylacetoacetate) (ALUMICHELATE D, Kawaken Fine Chemicals Co., Ltd.), 70 parts by mass of trimethylolpropane (1 mol) adduct of methylenediphenyl-4,4'-diisocyanate (3 mol) (D-109, Mitsui Chemicals, Inc.) as a polyfunctional isocyanate compound, 30 parts by mass of PEG200 #diacrylate (LIGHT ACRYLATE 4EG-A (KYOEISHA CHEMICAL CO., LTD.)) as a radical-polymerizable compound, and a radical polymerization initiator (PEROYL L, NOF CORPORATION) in an amount (0.3 parts by mass) equivalent to 1% by mass of the radical-polymerizable compound. The resultant mixture was mixed for emulsification with a Homogenizer (10000 rpm/5 min: T-50, IKA Japan Co.) and then was allowed to undergo interfacial polymerization and radical polymerization at 80° C. for 6 hours. After completion of reaction, the polymerization reaction liquid was left to cool to room temperature, and polymerized particles were separated through filtration.

<<Impregnation>>

The obtained polymerized particles were added to the impregnation liquid prepared in Production Example 1. The resultant mixture was stirred at a stirring rate of 200 rpm, at 80° C., and for 6 hours, followed by filtration. After that, the resultant was air dried to obtain solid catalyst particles. The solid catalyst particles after drying were cracked with AO-JET MILL (SEISHIN ENTERPRISE CO., LTD.) into primary particles, whereby capsule-type catalyst 2 was obtained.

Production Example 3

<Production of Photodegradable Silicon Compound (TBP-TPS: t-Butylperoxytriphenylsilane)>

Triphenylchlorosilane and t-butylhydroperoxide were used to synthesize TBP-TPS by the method described in the following document.

Document: V. N. Dibrivnyi, Yu. P. Pavlovskii, Yu. Ya. Van-Chin-Syan, Formation Enthalpies of Peroxy-Substituted Silanes, Russian Journal of Physical Chemistry A 84, pp. 778-783, 2010.

The structure of TBP-TPS is given below.

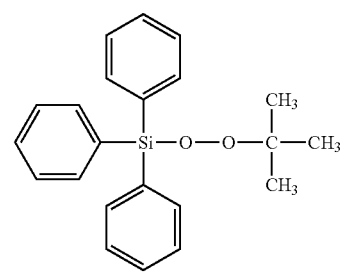 [SMILES: CC(C)(C)OO[Si](c1ccccc1)(c1ccccc1)c1ccccc1]

Production Example 4

<Production of Photodegradable Silicon Compound (3M2NBO-TPS: (3-methyl-2-nitro benzyloxy)triphenylsilane)>

A product obtained by reducing 3-methyl-2-nitrobenzoic acid with lithium aluminum hydride was allowed to react with triphenylchlorosilane, to thereby synthesize 3M2NBO-TPS.

The structure of 3M2NBO-TPS is given below.

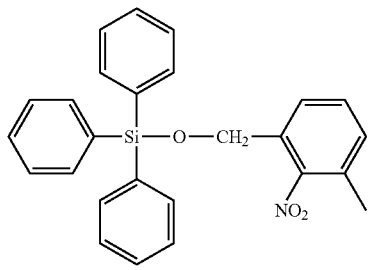 [SMILES: Cc1cccc(CO[Si](c2ccccc2)(c2ccccc2)c2ccccc2)c1[N+](=O)[O-]]

Comparative Example 1

<Cationic Curable Composition (Formulation 1)>

92 parts by mass of a cationic curable component (3',4'-epoxycyclohexylmethyl 3,4-epoxycyclohexanecarboxylate, CEL2021P, product of DICEL Corporation), 6 parts by mass of a photodegradable silicon compound (TBP-TPS obtained in Production Example 3), and 2 parts by mass of an alumichelate catalyst (ALUMICHELATE DOL, Kawaken Fine Chemicals Co., Ltd.) were mixed together to obtain a cationic curable composition (Formulation 1).

In order to avoid runaway reaction after UV irradiation, an aluminum chelate of a long-chain alkyl type was selected as the alumichelate.

Comparative Example 2

<Cationic Curable Composition (Formulation 2)>

92 parts by mass of a cationic curable component (3',4'-epoxycyclohexylmethyl 3,4-epoxycyclohexanecarboxylate, CEL2021P, product of DICEL Corporation), 6 parts by mass of a photodegradable silicon compound (3M2NBO-TPS obtained in Production Example 4), and 2 parts by mass of an alumichelate catalyst (ALUMICHELATE DOL, Kawaken Fine Chemicals Co., Ltd.) were mixed together to obtain a cationic curable composition (Formulation 2).

Example 1

<Cationic Curable Composition (Formulation 3)>

92 parts by mass of a cationic curable component (CEL2021P, product of DICEL Corporation), 6 parts by mass of a photodegradable silicon compound (TBP-TPS obtained in Production Example 3), and 2 parts by mass of a capsule-type catalyst (the capsule-type catalyst 1 obtained in Production Example 1) were mixed together to obtain a cationic curable composition (Formulation 3).

Example 2

<Cationic Curable Composition (Formulation 4)>

92 parts by mass of a cationic curable component (CEL2021P, product of DICEL Corporation), 6 parts by mass of a photodegradable silicon compound (3M2NBO-TPS obtained in Production Example 4), and 2 parts by mass of a capsule-type catalyst (the capsule-type catalyst 1 obtained in Production Example 1) were mixed together to obtain a cationic curable composition (Formulation 4).

Example 3

<Cationic Curable Composition (Formulation 5)>

92 parts by mass of a cationic curable component (CEL2021P, product of DICEL Corporation), 6 parts by mass of a photodegradable silicon compound (3M2NBO-TPS obtained in Production Example 4), and 2 parts by mass of a capsule-type catalyst (the capsule-type catalyst 2 obtained in Production Example 2) were mixed together to obtain a cationic curable composition (Formulation 5).

Example 4

<Cationic Curable Composition (Formulation 6)>

76 parts by mass of a cationic curable component (glycidyl ether-type epoxy resin, EP828, product of Mitsubishi Chemical Corporation), 18 parts by mass of a photodegradable silicon compound (3M2NBO-TPS obtained in Production Example 4), and 6 parts by mass of a capsule-type catalyst (the capsule-type catalyst 1 obtained in Production Example 1) were mixed together to obtain a cationic curable composition (Formulation 6).

Example 5

<Cationic Curable Composition (Formulation 7)>

A cationic curable composition (Formulation 7) was prepared to have the corresponding formulation presented in Table 1 below.

Example 6

<Cationic Curable Composition (Formulation 8)>

A cationic curable composition (Formulation 8) was prepared to have the corresponding formulation presented in Table 1 below.

Example 7

<Cationic Curable Composition (Formulation 9)>

A cationic curable composition (Formulation 9) was prepared to have the corresponding formulation presented in Table 1 below.

The oxetane compound used was 3-ethyl-3-{[(3-ethyl-oxetan-3-yl)methoxy]methyl}oxetane (OXT-221, product of TOAGOSEI CO., LTD.).

Comparative Example 3

<Cationic Curable Composition (Formulation 10)>

A cationic curable composition (Formulation 10) was prepared to have the corresponding formulation presented in Table 1 below.

Comparative Example 4

<Cationic Curable Composition (Formulation 11)>

A cationic curable composition (Formulation 11) was prepared to have the corresponding formulation presented in Table 1 below.

The formulations of Comparative Examples 1 to 4 and Examples 1 to 7 are summarized in Table 1.

TABLE 1

| | | Comparative Examples | | Examples | | | | | | | Comparative Examples | |
|---|---|---|---|---|---|---|---|---|---|---|---|---|
| | | 1 Formulation 1 | 2 Formulation 2 | 1 Formulation 3 | 2 Formulation 4 | 3 Formulation 5 | 4 Formulation 6 | 5 Formulation 7 | 6 Formulation 8 | 7 Formulation 9 | 3 Formulation 10 | 4 Formulation 11 |
| Cationic curable component | CEL2021P | 92 | 92 | 92 | 92 | 92 | | 92.5 | 92 | 84 | 92 | 92 |
| | EP828 | | | | | | 76 | | | | | |
| | Oxetane compound | | | | | | | | | 8 | | |
| Photodegradable silicon compound | TBP-TPS | 6 | | 6 | | | | | | | | |
| | 3M2NBO-TPS | | 6 | | 6 | 6 | 18 | 6 | 4 | 6 | | |
| Triphenylsilanol | | | | | | | | | | | 6 | |
| PI2074 | | | | | | | | | | | | 5.7 |
| KAYACURE DETX-S | | | | | | | | | | | | 0.3 |
| Aluminum components | ALUMICHELATE DOL | 2 | 2 | | | | | | | | | |
| | Capsule-type catalyst 1 | | | 2 | 2 | | 6 | 1.5 | 4 | 2 | 2 | 2 |
| | Capsule-type catalyst 2 | | | | | 2 | | | | | | |

The unit of the numerical values in Table 1 is parts by mass.

PI2074 is a photoacid generator obtained from Rhodia Japan, Ltd. [4-methylphenyl-4-(1-methylethyl)phenyliodoniumtetrakis(pentafluorophenyl)borate].

KAYACURE DETX-S is a sensitizer (2,4-diethylthioxane) obtained from NIPPON KAYAKU CO.

(Evaluation)
<Dsc Measurement>

DSC measurement (differential scanning calorimetry measurement) was performed under the following conditions.

Device: Photo-DSC [DSC6200 (Hitachi High-Tech Science Corporation)]
Amount evaluated: 10 mg
UV irradiation conditions:
   Mercury-xenon lamp UXM-200YA (USHIO LIGHTING, INC.)
   Temperature: 25° C.
   Irradiation time: 1 min
   Irradiation dose: 50 mW/cm$^2$
Thermal curing conditions:
   Heating rate: 10° C./min <<Formulation 1 and Formulation 2>>

First, for confirming curability by the photodegradable silicon compound and the aluminum chelate, evaluation of curability was performed on the systems where the aluminum chelate was directly formulated (Formulation 1 and Formulation 2).

—Results in the TBP-TPS System—

Table 2 and FIG. 1 present results of curability of the cationic curable composition of Formulation 1 (Comparative Example 1).

The chart (1) of FIG. 1 is the case of measurement by heating at 10° C./min after the UV irradiation, and the chart (2) of FIG. 1 is the case of measurement by direct heating without the UV irradiation. These charts indicate that the photodegradable silicon compounds degrade with only heat if it is a high temperature, to form an aluminum chelate and cation active species to be able to cure the epoxy resin (cationic curable component). However, the heat-generation onset temperature can be lowered by about 80° C. through the UV irradiation before the measurement.

—Results in the 3M2NBO-TPS System—

Next, results in the 3M2NBO-TPS system are presented.

Figure 2:
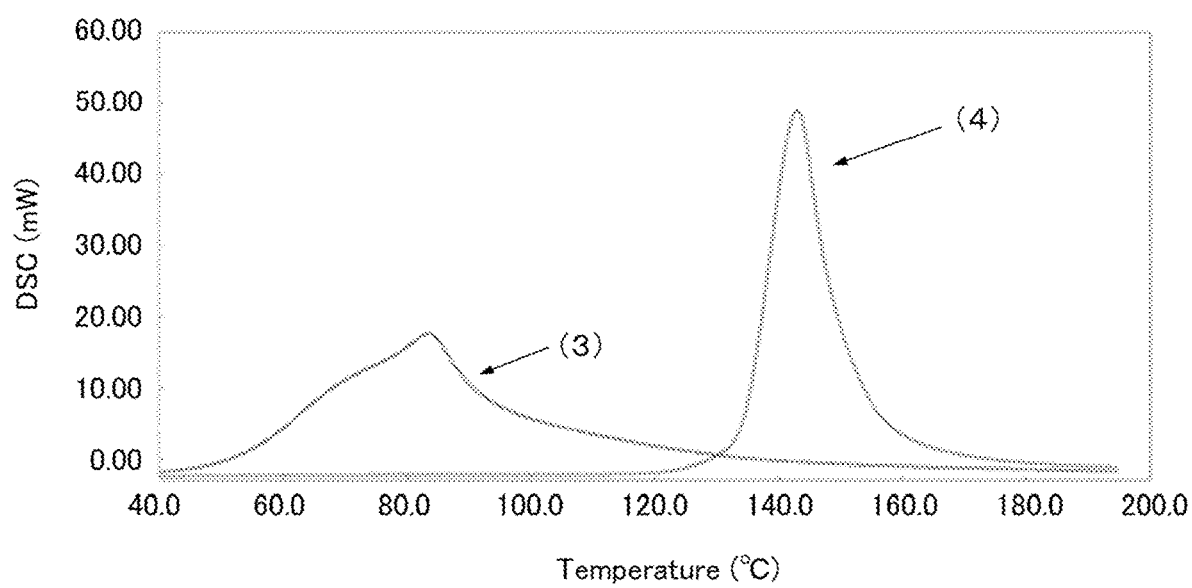
FIG. 2 is a chart presenting results of DSC of Formulation 2.

Table 3 and FIG. 2 present results of curability of the cationic curable composition of Formulation 2 (Comparative Example 2).

TABLE 2

| | | Chart of FIG. 1 | UV irradiation | Heat-generation onset temp. (° C.) | Exothermic peak temp. (° C.) |
|---|---|---|---|---|---|
| Comparative Example 1-1 | Formulation 1 | (1) | Performed | 44.7 | 114.5 |
| Comparative Example 1-2 | | (2) | Not performed | 126.6 | 167.7 |

TABLE 3

|  |  | Chart of FIG. 2 | UV irradiation | Heat-generation onset temp. (° C.) | Exothermic peak temp. (° C.) |
|---|---|---|---|---|---|
| Comparative Example 2-1 | Formulation 2 | (3) | Performed | Same time as the start of measurement | 83.5 |
| Comparative Example 2-2 |  | (4) | Not performed | 120.3 | 143.0 |

The 3M2NBO-TPS exhibited low-temperature curability as compared with the TBP-TPS system. The heat-generation onset temperature in the heating after the UV irradiation was that at the same time as the start of measurement.

<<Formulation 3 to Formulation 6>>

Next, results obtained when using capsule-type catalysts 1 and 2 prepared by the catalyst-impregnated treatment are presented below.

—Results in the TBP-TPS System—

Figure 3:
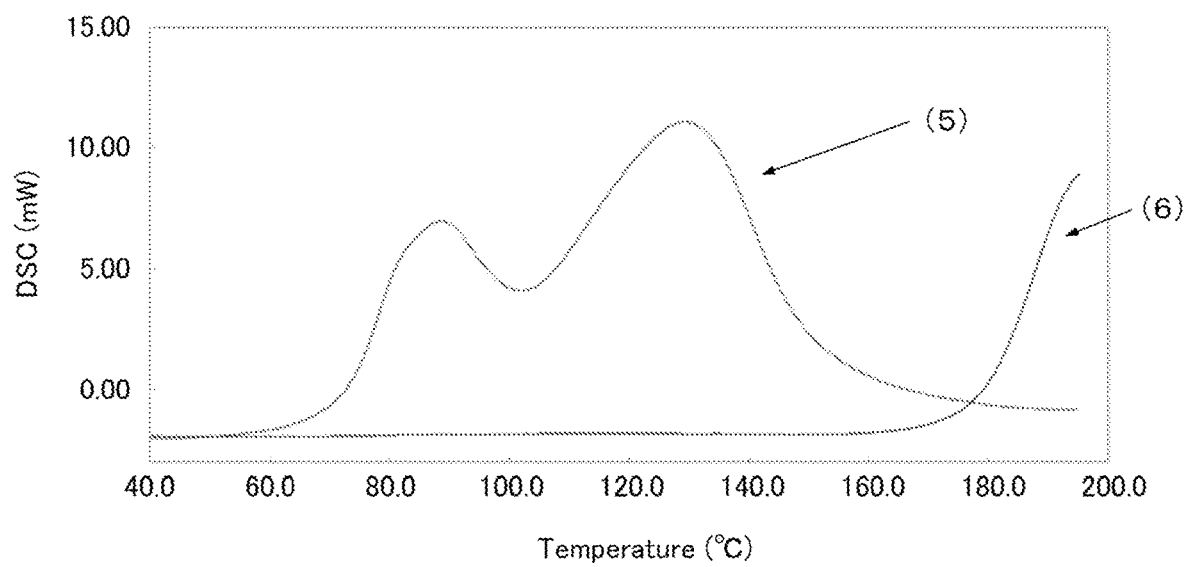
FIG. 3 is a chart presenting results of DSC of Formulation 3.

Table 4 and FIG. 3 present results of curability of the cationic curable composition of Formulation 3 (Example 1).

TABLE 4

|  |  | Chart of FIG. 3 | UV irradiation | Heat-generation onset temp. (° C.) | Exothermic peak temp. (° C.) |
|---|---|---|---|---|---|
| Example 1-1 | Formulation 3 | (5) | Performed | 47.4 | 88.2 (129.4) |
| Example 1-2 |  | (6) | Not performed | 160.9 | — |

The latent capsule-type catalyst exhibited the onset temperature equivalent to that of ALUMICHELATE DOL (aluminum monoacetylacetonate bis(alkyl acetate) likely because the latent capsule-type catalyst was prepared through impregnation of highly active tris(ethylacetoacetate)-type aluminum chelate. Also, likely because two kinds of aluminum chelates were impregnated, two heat-generation peaks appeared.

—Results in the 3M2NBO-TPS System—

Next, results in the 3M2NBO-TPS system are presented.

—Case of Capsule-Type Catalyst 1—

Figure 4:
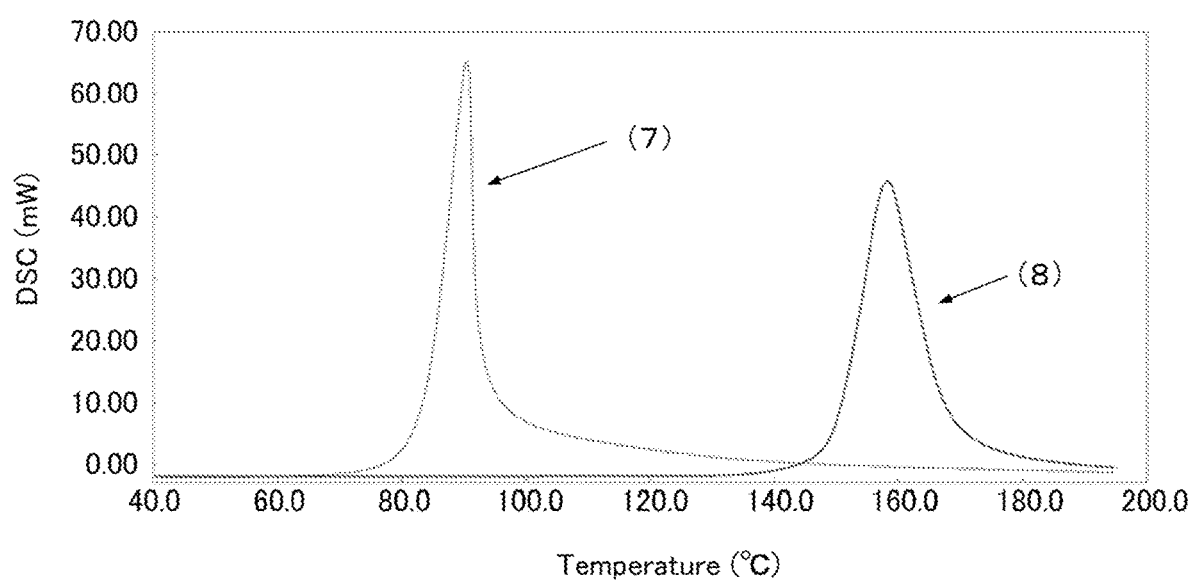
FIG. 4 is a chart presenting results of DSC of Formulation 4.

Table 5 and FIG. 4 present results of curability of the cationic curable composition of Formulation 4 (Example 2).

TABLE 5

|  |  | Chart of FIG. 4 | UV irradiation | Heat-generation onset temp. (° C.) | Exothermic peak temp. (° C.) | Exothermic peak intensity (mW) |
|---|---|---|---|---|---|---|
| Example 2-1 | Formulation 4 | (7) | Performed | 65.3 | 90.5 | 65.39 |
| Example 2-2 |  | (8) | Not performed | 134.0 | 158.3 | 45.83 |

The 3M2NBO-TPS system exhibited very sharp heat generation property for curing. The exothermic peak temperature when the UV-irradiated product was heated and cured was about 90° C., and the exothermic peak intensity reached 65 mW, indicating that this system is very excellent in temperature reduction and short-time curability. Next, results obtained when using the capsule-type catalyst 2 prepared by subjecting the impregnation liquid to a high-temperature treatment in the impregnation treatment of the catalyst are presented below.

—Case of Capsule-Type Catalyst 2—

Figure 5:
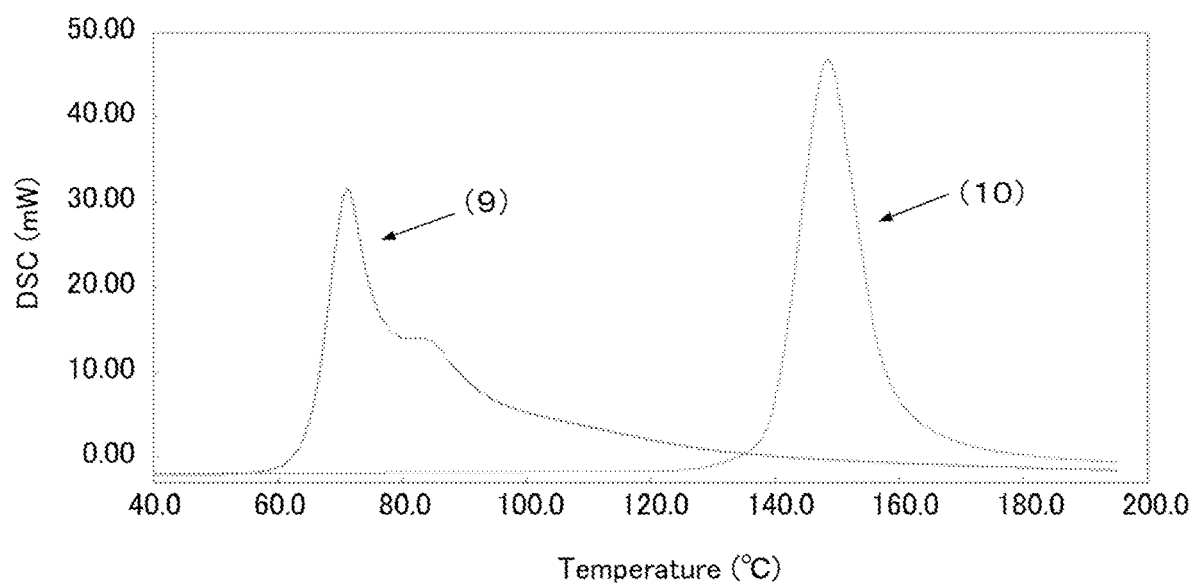
FIG. 5 is a chart presenting results of DSC of Formulation 5.

Table 6 and FIG. 5 present results of curability of the cationic curable composition of Formulation 5 (Example 3).

TABLE 6

|  |  | Chart of FIG. 5 | UV irradiation | Heat-generation onset temp. (° C.) | Exothermic peak temp. (° C.) | Exothermic peak intensity (mW) |
|---|---|---|---|---|---|---|
| Example 3-1 | Formulation 5 | (9) | Performed | 54.1 | 71.2 | 31.51 |
| Example 3-2 |  | (10) | Not performed | 125.6 | 148.6 | 46.89 |

When the capsule-type catalyst 2 was used, the heat-generation onset temperature in the heating after the UV irradiation was 54° C. and the exothermic peak temperature was 71° C., exhibiting low-temperature curability. The exothermic peak intensity in this case was 30 mW or higher, exhibiting short-time curability.

—Case where Cationic Curable Component is Glycidyl Ether-Type Epoxy Resin—

Figure 6:
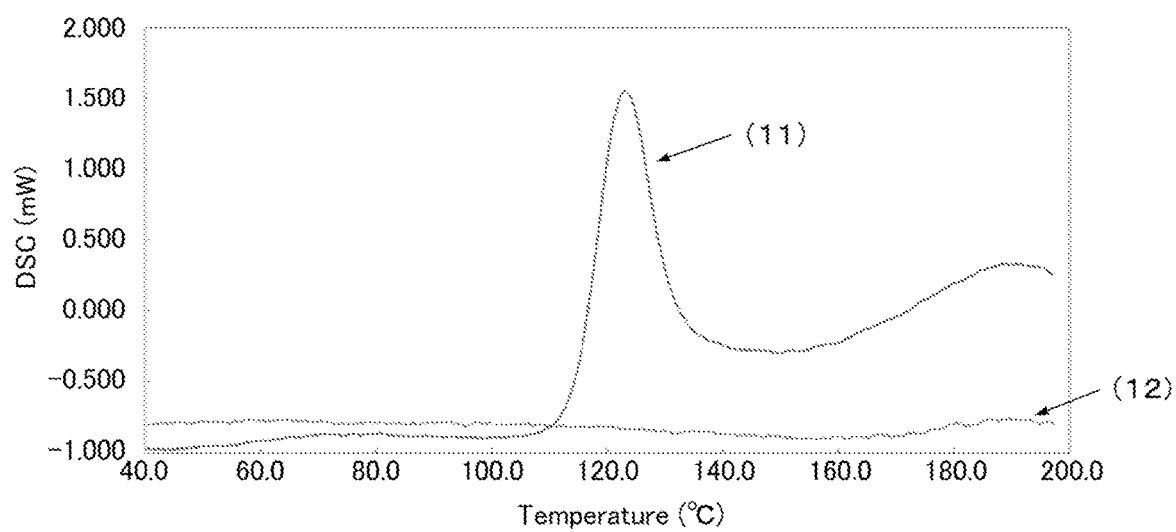
FIG. 6 is a chart presenting results of DSC of Formulation 6.

Table 7 and FIG. 6 present results of curability of the cationic curable composition of Formulation 6 (Example 4).

TABLE 7

|  |  | Chart of FIG. 6 | UV irradiation | Heat-generation onset temp. (° C.) | Exothermic peak temp. (° C.) |
|---|---|---|---|---|---|
| Example 4-1 | Formulation 6 | (11) | Performed | 107.7 | 123.2 |
| Example 4-2 |  | (12) | Not performed | — | — |

Even when using a bisphenol A-type epoxy resin which is a commonly used epoxy resin, the present curing system exhibited favorable low-temperature, short-time curability.

Figure 7:
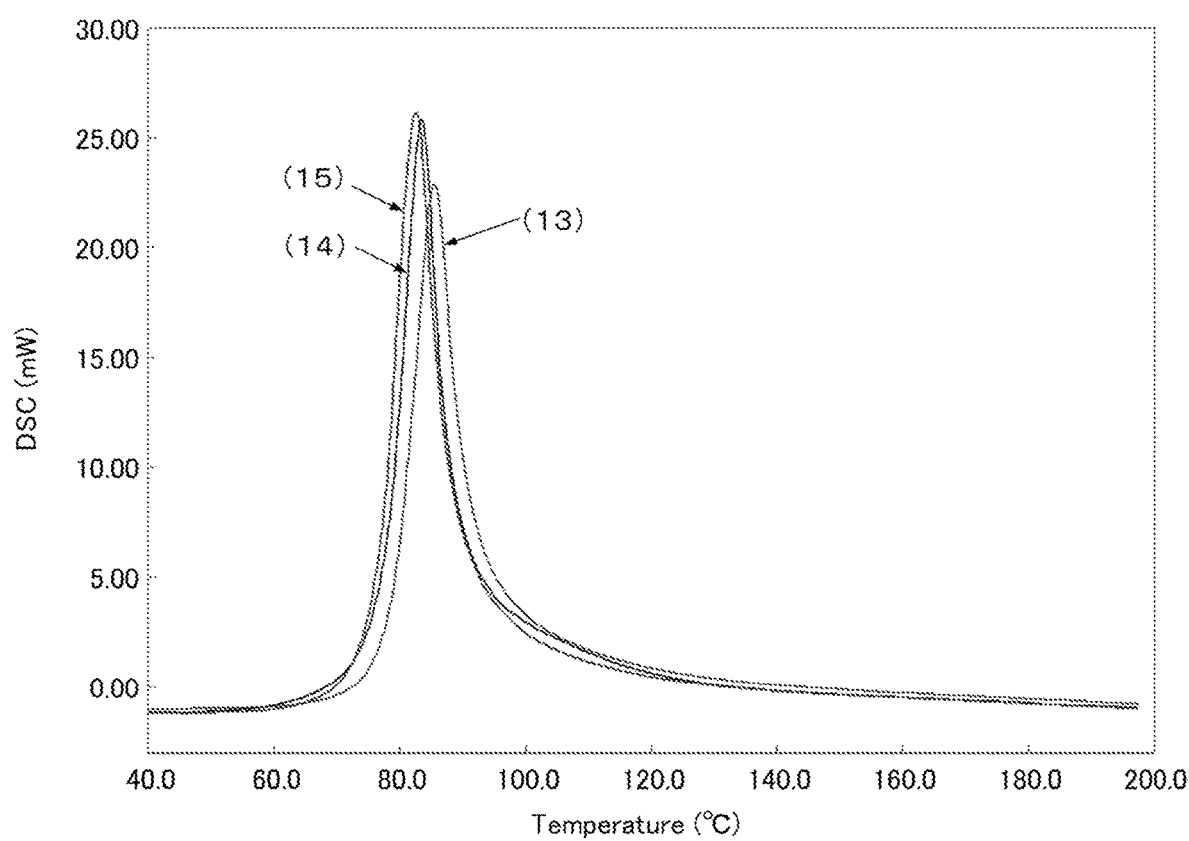
FIG. 7 is a chart presenting results of DSC of Formulations 7 to 9.

Table 8 and FIG. 7 present evaluation results of curability of the cationic curable compositions of Formulations 7 to 9 (Examples 5 to 7).

TABLE 8

|  |  | Chart of FIG. 7 | UV irradiation | Heat-generation onset temp. (° C.) | Exothermic peak temp. (° C.) |
|---|---|---|---|---|---|
| Example 5-1 | Formulation 7 | (13) | Performed | 63.6 | 85.6 |
| Example 5-2 |  | — | Not performed | 121.7 | 143.7 |
| Example 6-1 | Formulation 8 | (14) | Performed | 56.8 | 83.6 |
| Example 6-2 |  | — | Not performed | 131.5 | 154 |
| Example 7-1 | Formulation 9 | (15) | Performed | 57.1 | 82.6 |
| Example 7-2 |  | — | Not performed | 122.3 | 144.1 |

It was confirmed from Formulation 7 (Example 5) that even when reducing the amount of the latent capsule-type catalyst, favorable low-temperature, short-time curability was exhibited. Also, it was confirmed from Formulation 8 (Example 6) that the heat-generation onset temperature and the exothermic peak temperature could be lowered by using the latent capsule-type catalyst in an equal amount to that of the photodegradable silicon compound. Further, it was confirmed from Formulation 9 (Example 7) that the heat-generation onset temperature and the exothermic peak temperature could also be lowered by containing the oxetane compound in the cationic curable composition.

In the above, it was confirmed that use of the latent capsule-type catalyst and the photodegradable silicon compound made it possible to cure an epoxy resin at a specific temperature in a short time after UV irradiation. Next, liquid life evaluation is presented below.

<Liquid Life Evaluation 1>
<<Before UV Irradiation>>

Working life was evaluated on cationic curable compositions obtained by mixing raw materials together, after which no UV irradiation was performed. The evaluation was made in the following manner. Results are presented in Table 9.

[Evaluation Method]
<DSC Measurement>

DSC measurement (differential scanning calorimetry measurement) was performed under the following conditions to evaluate the liquid life from the retention rate of the total exothermic amount after storage for 48 h at room temperature.

Device: DSC6200 (Hitachi High-Tech Science Corporation)
Amount evaluated: 10 mg
  Storage temperature: 25° C. (room temperature)
  Heating rate: 10° C./min <Liquid Life Evaluation 2>

UV irradiation and DSC measurement (differential scanning calorimetry measurement) were performed under the following conditions.

TABLE 9

|  |  | Examples | | | | | | | Comparative Example |
|---|---|---|---|---|---|---|---|---|---|
|  |  | 1 Formulation 3 | 2 Formulation 4 | 3 Formulation 5 | 4 Formulation 6 | 5 Formulation 7 | 6 Formulation 8 | 7 Formulation 9 | 3 Formulation 10 |
| Total exothermic amount (J/g) | Before storage | −442 | −452 | −458 | −414 | −440 | −447 | −451 | −437 |
|  | After 48 h | −438 | 151 | 153 | −411 | −435 | 437 | 134 | Cured |
| Retention rate of total exothermic amount (after 48 h/ before storage × 100) (%) |  | 99.1 | 99.8 | 98.9 | 99.3 | 98.9 | 97.8 | 96.2 | — |

In each of the Examples, the liquid life at room temperature was favorable, and the retention rate of the total exothermic amount after the cationic curable composition had been left for 48 h at room temperature was 95% or higher. Meanwhile, in Comparative Example 3 where a silanol compound was directly contained rather than the photodegradable silicon compound, the cationic curable composition was cured after left for 48 h at room temperature.

<<After UV Irradiation>>

Working life was evaluated on cationic curable compositions obtained by mixing raw materials together, after which UV irradiation was performed. The evaluation was made by the working life evaluation method using the DSC measurement similar to that used in the evaluation before UV irradiation. UV irradiation conditions are given below. Results are presented in Table 10.

[Evaluation Method]
  UV irradiation conditions:
    Mercury-xenon lamp UXM-200YA (USHIO LIGHTING, INC.)
    Temperature: 25° C.
    Irradiation time: 1 min
    Irradiation dose: 50 mW/cm$^2$ Device: Photo-DSC [DSC6200 (Hitachi High-Tech Science Corporation)]
  Amount evaluated: 10 mg
  UV irradiation conditions:
    Mercury-xenon lamp UXM-200YA (USHIO LIGHTING, INC.)
    Temperature: 25° C.
    Irradiation time: 1 min
    Irradiation dose: 50 mW/cm$^2$
  Thermal curing conditions:
    Heating rate: 10° C./min <<Formulation 4>>

DSC measurement (differential scanning calorimetry measurement) was performed on Formulation 4 (Example 2) under the following conditions. Results are presented in Table 11.
  (i) The DSC measurement was performed immediately after the UV irradiation (within 1 hour).
  (ii) The DSC measurement was performed after the cationic curable composition had been left for 48 hours (25° C., 65% RH) from the UV irradiation.
  (iii) The DSC measurement was performed immediately after the UV irradiation after the cationic curable composition had been stored for 1 week at room temperature (25° C., 65% RH).

TABLE 10

|  |  | Comp. Ex. | | Examples | | | | | | |
|---|---|---|---|---|---|---|---|---|---|---|
|  |  | 1 Formulation 1 | 2 Formulation 2 | 1 Formulation 3 | 2 Formulation 4 | 3 Formulation 5 | 4 Formulation 6 | 5 Formulation 7 | 6 Formulation 8 | 7 Formulation 9 |
| Total exothermic amount (J/g) | Before storage | −405 | −447 | −438 | −456 | −458 | −411 | −439 | −445 | −448 |
|  | After 48 h | −152 | −122 | −351 | −453 | −416 | −398 | −409 | −406 | −402 |
| Retention rate of total exothermic amount (Before storage/after 48 h × 100) (%) |  | 37.5 | 27.3 | 80.1 | 99.3 | 90.8 | 96.8 | 93.2 | 91.2 | 89.7 |

Examples 1 to 7 containing the latent capsule-type catalyst exhibited favorable liquid life even after the UV irradiation. In each of the Examples, the retention rate of the total exothermic amount after storage for 48 h at room temperature was 80% or higher. Meanwhile, in Comparative Examples 1 and 2 where the aluminum chelate was directly contained, the retention rate of the total exothermic amount after 48 h at room temperature was lower than 40%.

TABLE 11

| Measurements | Heat-generation onset temp. (° C.) | Exothermic peak temp. (° C.) | Total exothermic amount (J/g) |
|---|---|---|---|
| (i) After UV irradiation, Left for 0 h | 65.3 | 90.5 | −456 |

TABLE 11-continued

| Measurements | | Heat-generation onset temp. (° C.) | Exothermic peak temp. (° C.) | Total exothermic amount (J/g) |
|---|---|---|---|---|
| (ii) | After UV irradiation, Left for 48 h | 66.9 | 89.0 | −453 |
| (iii) | Stored for 1 week at room temperature ⇒ After UV irradiation | 65.1 | 89.3 | −451 |

Here, regarding Formulation 4, the value of "[(H$_0$–H$_{48}$)/H$_0$]×100" is 0.7 from Table 11.

Because the latent capsule-type catalyst was used, there was no reduction observed in the total exothermic amount of the product after being left for 48 h from the UV irradiation as compared with the product before being left. Also, the photodegradable silicon compound does not generate triphenylsilanol without UV irradiation, and thus the product even after being left for 1 week at room temperature exhibited equivalent curability to that of the product before being left (there was no reduction in the total exothermic amount).

<<Formulation 5>>

Next, results in the capsule-type catalyst 2-formulation system exhibiting low-temperature curability are presented.

DSC measurement (differential scanning calorimetry measurement) was performed on Formulation 5 (Example 3) under the following conditions. Results are presented in Table 11.

(i) The DSC measurement was performed immediately after the UV irradiation (within 1 hour).
(ii) The DSC measurement was performed after the cationic curable composition had been left for 48 hours (25° C., 65% RH) from the UV irradiation.
(iii) The DSC measurement was performed immediately after the UV irradiation after the cationic curable composition had been stored for 1 week at room temperature (25° C., 65% RH).

TABLE 12

| Measurements | | Heat-generation onset temp. (° C.) | Exothermic peak temp. (° C.) | Total exothermic amount (J/g) |
|---|---|---|---|---|
| (i) | After UV irradiation, Left for 0 h | 54.1 | 71.2 | −458 |
| (ii) | After UV irradiation, Left for 48 h | 57.1 | 70.3 | −416 |
| (iii) | Stored for 1 week at room temperature ⇒ After UV irradiation | 54.8 | 69.1 | −450 |

Here, regarding Formulation 5, the value of "[(H$_0$–H$_{48}$)/H$_0$]×100" is 9.2 from Table 12.

Likely because of its low-temperature curability, the product exhibited slight reduction in the total exothermic amount after the UV irradiation for 48 h. However, even when using the capsule-type catalyst of a low-temperature active type, favorable liquid life was exhibited similarly. Regarding the case where the product was left without UV irradiation, it was stored in the absence of triphenylsilanol in the system. Therefore, there was almost no reduction observed in the total exothermic amount.

<Amount of Anions>

A cured product of the cationic curable composition of Formulation 11 (Comparative Example 4) was measured for the amount of anions by the following method.

[Evaluation Method]

Anion Analysis:
Ion chromatography ICS-3000 (Japan Dionex Corporation)
Curing conditions: 200° C./10 min
Extraction conditions: extraction for 10 hours at 100° C. at a concentration of 20 wt % in ultrapure water Regarding Formulation 11, many organic acids and various anions more than 100 ppm were detected.

When Formulations 3 to 9 were similarly measured for the amount of anions, the amount of various anions detected was 1 ppm or less.

INDUSTRIAL APPLICABILITY

The cationic curable composition of the present invention generates a silanol group by light irradiation and can be cured by heat. The cationic curable composition can be stored for a long period of time, has excellent low-temperature rapid curability, and further has a long working life after light irradiation. Therefore, the cationic curable composition can suitably be used as an adhesive.

The invention claimed is:

1. A cationic curable composition that generates a silanol group by light irradiation and is cured by heat, the cationic curable composition comprising:
a cationic curable component;
porous particles holding an aluminum chelate; and
a photodegradable silicon compound that generates a silanol group by photodegradation,
wherein the photodegradable silicon compound has at least one selected from the group consisting of a peroxysilyl group, and an o-nitrobenzyloxy group bonded directly to a silicon atom, and
wherein the photodegradable silicon compound having the o-nitrobenzyloxy group bonded directly to the silicon atom includes a silicon compound represented by following General Formula (II),

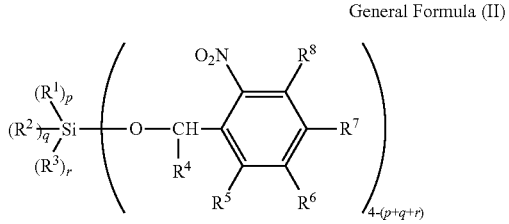

General Formula (II)

wherein in the General Formula (II), $R^1$, $R^2$, and $R^3$ represent an unsubstituted aryl group, $R^4$ represents a hydrogen atom, an unsubstituted or substituted alkyl group having from 1 to 10 carbon atoms, or an unsubstituted or substituted phenyl group, $R^5$, $R^6$, $R^7$, and $R^8$, which may be identical or different, each represent a hydrogen atom, a nitro group, a cyano group, a hydroxy group, a mercapto group, a halogen atom, an acetyl group, an allyl group, an unsubstituted or substituted alkyl group having from 1 to 5 carbon atoms, an unsubstituted or substituted alkoxy group having from 1 to 5 carbon atoms, an unsubstituted or substituted aryl group, or an unsubstituted or substituted aryloxy group, and p, q, and r represent integers that satisfy conditions: 0≤p≤3, 0≤q≤3, 0≤r≤3, and 1≤p+q+r≤3.

2. The cationic curable composition according to claim 1, wherein the porous particles comprise a polyurea resin.

3. The cationic curable composition according to claim 2, wherein the porous particles further comprise a vinyl resin as a constituting component thereof.

4. The cationic curable composition according to claim 1, wherein the cationic curable component comprises an epoxy resin.

5. The cationic curable composition according to claim 4, wherein the epoxy resin comprises at least one selected from the group consisting of an alicyclic epoxy resin and a glycidyl ether epoxy resin.

6. The cationic curable composition according to claim 4, wherein the cationic curable component further comprises an oxetane compound.

7. The cationic curable composition according to claim 1, wherein a quantity of heat ($H_0$) generated in differential scanning calorimetry after light irradiation for 1 minute with a mercury xenon lamp at 50 mW/cm$^2$ and a quantity of heat ($H_{48}$) generated in the differential scanning calorimetry after 48 hours pass from the light irradiation satisfy formula (1) below:

$$-30 \leq [(H_0 - H_{48})/H_0] \times 100 \leq 30 \qquad \text{Formula (1)}.$$

8. The cationic curable composition according to claim 1, wherein a heat-generation onset temperature in differential scanning calorimetry after light irradiation for 1 minute with a mercury xenon lamp at 50 mW/cm$^2$ is 45° C. or higher but 80° C. or lower.

9. The cationic curable composition according to claim 1, wherein an exothermic peak temperature in differential scanning calorimetry after light irradiation for 1 minute with a mercury xenon lamp at 50 mW/cm$^2$ is 60° C. or higher but 130° C. or lower.

10. A method for producing a cured product, the method including:
    irradiating the cationic curable composition according to claim 1 with light to photodegrade the photodegradable silicon compound to generate the silanol group, followed by heating.

11. The method according to claim 10, wherein the heating is performed at 60° C. or higher but 180° C. or lower.

* * * * *